_United States Patent Office_  2,702,063
Patented Feb. 15, 1955

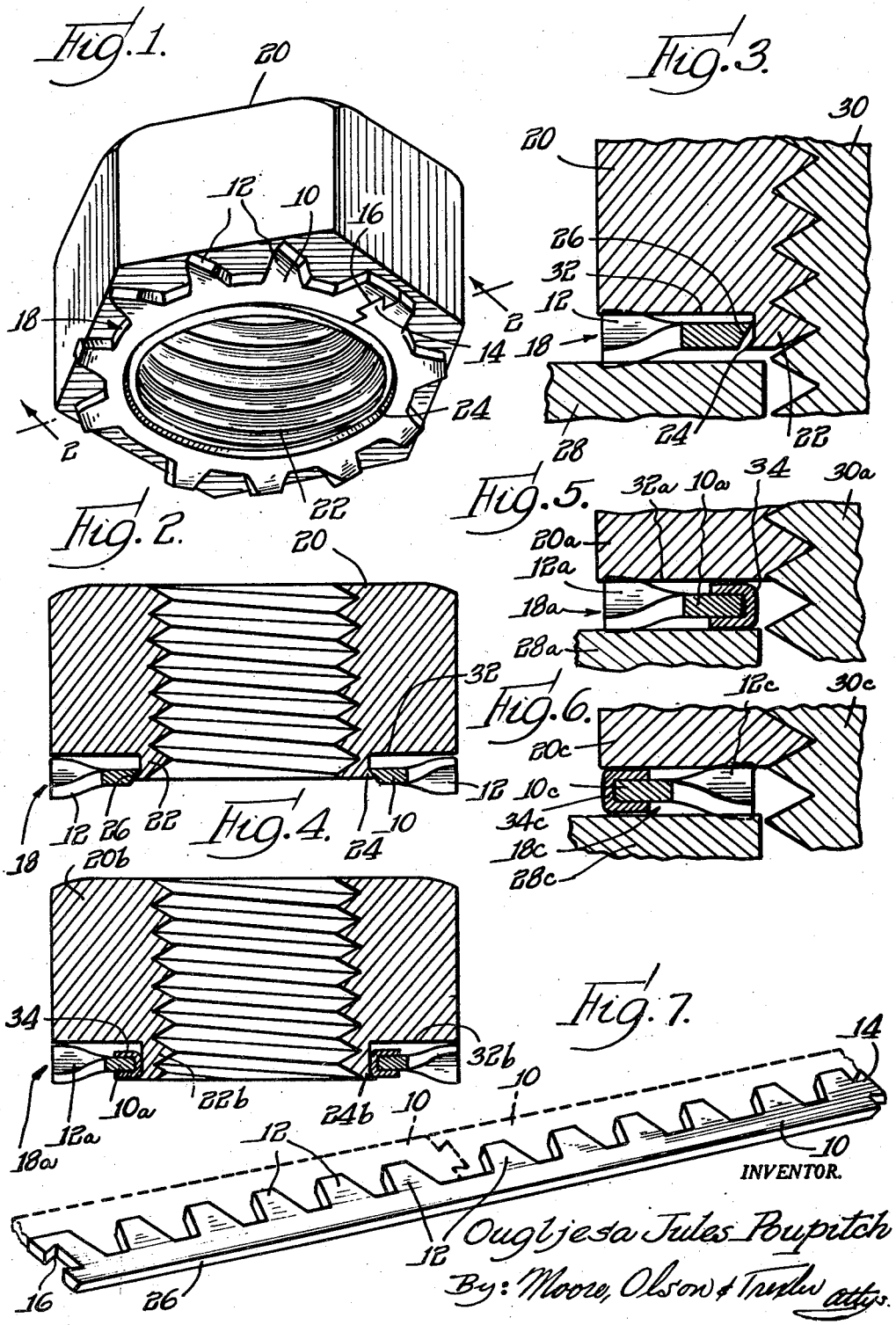

2,702,063

THREADED FASTENER HAVING TOOTHED LOCK WASHER COUPLED THEREWITH

Ougljesa Jules Poupitch, Itasca, Ill., assignor to Illinois Tool Works, Chicago, Ill., a corporation of Illinois Application June 1, 1951, Serial No. 229,366

2 Claims. (Cl. 151—37)

This invention is concerned with a fastener device and more particularly with a toothed lock washer.

This invention contemplates the provision of a lock washer punched from a straight flat strip or ribbon and curled into a circular ring to form a toothed annular lock washer. By initially forming the washer as a straight strip, it is possible to punch complementary washers from a ribbon of metal with no waste of material whatsoever. In earlier attempts to produce such a lock washer it was found difficult to keep the lock washer in annular form. Although the ends of the strip were interlocked, it was found that the ends frequently would spring out of a common plane and the washer would be displaced from its desired continuous circular form and such washers never came into commercial use.

The principal object of this invention is to provide a practical wasteless lock washer formed as a straight strip and curled into the form of an annulus.

A more specific object of this invention is to provide a lock washer formed as a straight strip, curled into annular form, and secured in that form.

This invention contemplates retaining the lock washer in annular form by interlocking the ends of the strip constituting the washer and by fixing the interlocked ends in a common plane either by means of a grommet or by preassembling the washer with a screw element such as a screw or nut.

Further objects and advantages of the present invention will be apparent from the following detailed description when taken in connection with the accompanying drawing wherein:

Fig. 1 is a perspective view showing one of my lock washers preassembled with a nut;

Fig. 2 is a longitudinal sectional view of the same taken along the line 2—2 of Fig. 1;

Fig. 3 is a fragmentary longitudinal sectional view showing the nut and washer assembled with a stud and work piece;

Fig. 4 is a view similar to Fig. 2 showing a modified washer;

Fig. 5 is a view similar to Fig. 3 showing the modified washer;

Fig. 6 is a view similar to Fig. 5 showing a further modified washer having internal teeth;

Fig. 7 is a perspective view showing the strip prior to folding into annular form; and Referring first to Figs. 1, 2 and 7, it may be seen that the washer first is formed as a straight strip 10 having teeth 12 along one edge and formed with complementary dovetail tongue and groove connections 14 and 16 at opposite ends. The strip may be formed from a metal ribbon with no waste whatsoever as is illustrated by complementary strip portions 10 shown in dotted lines and forming the remainder of the ribbon. It will be noted that the two teeth 12 of the strip 10 at the center of the strip are spaced apart a greater distance than the remaining teeth due to the formation of the ends of the strip portions 10 shown in dotted lines between these teeth.

The strip then is coiled or bent into annular form and the tongue and groove connections are interlocked to form the annular, externally toothed lock washer 18 best seen in Fig. 1. It will be understood that the teeth 12 are twisted either in the initial stamping operation or later, and that the washer 18 preferably is hardened after interlocking of the ends thereof. The lock washer is preassembled with a nut 20 which has an axially extending skirt 22. The bottom edge of the skirt is swaged outwardly at 24 to overlie the lower edge of the washer 18. The inner edge 26 (this being the outer edge of the initial metal ribbon) preferably is beveled as best seen in Fig. 2 so that the axially extending skirt or neck on the nut need not extend below the washer and therefore will not interfere with the tightening of the nut and washer against a work piece. The washer 18 is shown in Fig. 3 as tightened against a work piece 28 by the nut 20 threaded on a stud 30. It will be noted that the teeth 12 have been compressed somewhat and that the sharp edges thereof have dug slightly into the nut and work piece, as is common with twisted tooth lock washers, and that the axially extending skirt or neck 22 has not contacted the work piece 28.

It will be apparent that in the embodiment described above the ends of the strip 10 are substantially fixed in a common plane by being trapped between the swaged skirt part 24 and the lower end 32 of the nut so that ends of the washer cannot spring apart.

It is not always desirable to preassemble lock washers with screw elements such as nuts or screws and I therefore have provided means in the form of a grommet for retaining the interlocked end of the washer in a common plane as shown in Figs. 4 and 5. The straight stamped strip 10a is identical with the strip 10 disclosed heretofore with the exception of the free or outer edge of the strip which is not beveled as is the edge 26 of the strip 10. The strip 10a is provided with teeth 12a and tongue and groove connections at the ends similar to the corresponding parts of the strip 10. It will be understood that the teeth 12a, like the teeth 12, are twisted either at the time the strip 10a first is punched from the metal ribbon or at a later time. All of the teeth need not be twisted, although they generally are as greater holding power is effected when all of the teeth are twisted. The strip 10a is coiled edgewise or bent into annular form and the ends are interlocked. A grommet or eyelet 34 then is inserted through the central aperture of the washer to prevent relative axial displacement of the tongue and groove portions and consequent separation of the ends of the washer 18a so formed. The washer 18a may be used individually with a conventional unskirted nut 20a, work piece 28a and threaded stud 30a as shown in Fig. 5. In this case, the thickened inner rim afforded by the grommet 34 prevents the twisted teeth 12a from being flattened to a position where they would not be effective to lock the nut.

The washer 18a can be preassembled with a screw element if desired as is illustrated in Fig. 4. The nut 20b in this case is identical with the nut 20 except that the axial extension or skirt 22b is somewhat longer than on the nut 20 in order to accommodate the thickened rim of the washer 18a provided by the grommet 34. The washer 18a is trapped between the swaged skirt portion 24b and the lower end 32b of the nut. Both the thickened rim afforded by the grommet 34 and the axially extending skirt 22b prevent the twisted teeth 12a of the washer from being flattened an undue amount.

It is not necessary that the strip disclosed herein be folded or bent into an annulus with the teeth projecting externally. The principles of the invention are equally applicable to an internally toothed washer as is illustrated at 18c in Fig. 6. The strip 10c may be identical with the strip 10a and includes the twisted teeth 12c. The grommet or rim 34c on the free edge of the strip 10c is placed on the outside of the washer after the strip is coiled or bent into annular form with the teeth 12c projecting inwardly. The washer in this form is used with a nut 20c, work piece 28c and stud 30c identical with the corresponding parts in Fig. 5. The thickened rim of the washer afforded by the grommet 34c again prevents excessive flattening of the teeth 12 as the nut is tightened on the stud, and it will be understood that the grommet 34c maintains the ends of the washer strip 10c locked together.

The formation of a washer as herein disclosed from a straight strip bent into annular form allows washers to be manufactured with absolutely no waste of the sheet material from which they are stamped. The use of the swaged or flared skirt on the nut or the use of the grommet prevents axial displacement of the ends of the washers and therefore maintains the ends of the washers locked together and renders a washer so formed practical. The washers so formed are stronger than those formed in the usual manner by punching from a sheet of metal in that the grain of the metal stock runs in the same direction throughout rather than differing in each tooth and in each increment of the rings to which the teeth are attached. The structure locking the ends of the washer against axial displacement, for example the grommet or the nut skirt, prevents the twitsed teeth from being flattened to such an extent that they cannot lock the screw element efficaciously.

Although certain preferred embodiments of my invention have been shown and described for illustrative purposes, it is to be understood that my invention includes all that which falls within the spirit and scope of the appended claims.

I claim:

1. A fastening device comprising a preassembled lock washer and threaded rotary fastener, said lock washer including a substantially flat sheet metal annular body portion in the form of a strip having a bevelled surface along one edge thereof throughout its length and disposed in a common plane, the ends of said strip being interlocked with each other, a plurality of integral radially extending resilient prongs on the opposite edge of said strip, said prongs being deflected to present locking teeth projecting beyond the bounding planes of said annular body, said rotary fastener including a radially extending clamping face, a substantially cylindrical annular skirt projecting from said clamping face, and washer-retaining means extending generally radially from said skirt and spaced a predetermined distance axially from said clamping face to underlie and engage the bevelled edge of said strip, said washer being disposed with the annular body portion thereof trapped between said clamping face and said washer-retaining means, said predetermined axial distance being such as to permit limited axial movement of the washer as an incident to the flexing of said resilient prongs while maintaining the ends of said washer body strip substantially in said common plane and in interlocked relationship.

2. A fastening device comprising a preassembled lock washer and threaded rotary fastener as set forth in claim 1 wherein the washer teeth extend from the outer edge of the body strip, and the axially extending skirt is surrounded by the inner bevelled edge of the washer body.

References Cited in the file of this patent

UNITED STATES PATENTS

| 56,124 | Till | July 3, 1866 |
| 1,740,852 | Frischmuth | Dec. 24, 1929 |
| 1,847,314 | Stoll | Mar. 1, 1932 |
| 1,866,304 | Hosking | July 5, 1932 |
| 1,883,068 | Stoll | Oct. 18, 1932 |
| 2,113,425 | Crowther | Apr. 5, 1938 |
| 2,227,464 | Olson | Jan. 7, 1941 |
| 2,236,235 | Head | Mar. 25, 1941 |

FOREIGN PATENTS

| 141,675 | Great Britain | Dec. 16, 1920 |
| 477,007 | Germany | May 30, 1929 |
| 779,361 | France | Apr. 3, 1935 |